(12) United States Patent
Rattelade

(10) Patent No.: US 10,302,969 B2
(45) Date of Patent: *May 28, 2019

(54) EYEGLASS SYSTEM AND METHOD OF ENGAGEMENT

(71) Applicant: Benoit M. Rattelade, Barrie (CA)

(72) Inventor: Benoit M. Rattelade, Barrie (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,565

(22) Filed: Jul. 17, 2017

(65) Prior Publication Data

US 2017/0315383 A1    Nov. 2, 2017

Related U.S. Application Data

(60) Continuation-in-part of application No. 14/933,408, filed on Nov. 5, 2015, now Pat. No. 9,709,825, which
(Continued)

(51) Int. Cl.
*G02C 7/08* (2006.01)
*G02C 9/04* (2006.01)
(Continued)

(52) U.S. Cl.
CPC .............. *G02C 7/086* (2013.01); *G02C 5/02* (2013.01); *G02C 7/10* (2013.01); *G02C 9/00* (2013.01);
(Continued)

(58) Field of Classification Search
CPC ................ G02C 5/008; G02C 2200/08; G02C 2200/32; G02C 7/086; G02C 9/00; G02C 9/04
(Continued)

(56) References Cited

U.S. PATENT DOCUMENTS 6,293,671 B1    9/2001 Masunaga
6,341,864 B1    1/2002 Ng
(Continued)

FOREIGN PATENT DOCUMENTS

CA    2665378    11/2010
JP    2000147435    5/2000
(Continued)

OTHER PUBLICATIONS http://eyenavision.com/products/sunlenses, 4 pages, publicly available as of Sep. 17, 2013.
(Continued)

*Primary Examiner* — Darryl J Collins
(74) *Attorney, Agent, or Firm* — Sand, Sebolt & Wernow Co., LPA

(57) ABSTRACT

An eyeglass system including primary glasses and detachably engageable auxiliary glasses. The auxiliary glasses include a first and second auxiliary lens connected together by a bridge. Each lens has an exterior surface, an interior surface, and a peripheral edge extending between the interior and exterior surfaces. An aperture is defined in each of the lenses and the aperture extends between the interior and exterior surfaces, and originates in the peripheral edge and extends for a distance into the lens. A connector is engaged in the aperture in each of the lenses and this connector detachably engages the primary glasses. Preferably, the aperture is keyhole-shaped and the connector includes a boss that is a complementary keyhole shape. The connector may be provided with a magnet that is attracted to a magnet embedded in a lens of the primary glasses.

19 Claims, 11 Drawing Sheets

Related U.S. Application Data is a division of application No. 14/030,382, filed on Sep. 18, 2013, now Pat. No. 9,188,797.

(51) Int. Cl.
  *G02C 5/02* (2006.01)
  *G02C 9/00* (2006.01)
  *G02C 7/10* (2006.01)

(52) U.S. Cl.
  CPC ........... *G02C 9/04* (2013.01); *G02C 2200/04* (2013.01); *G02C 2200/32* (2013.01)

(58) Field of Classification Search
  USPC ..... 351/47, 57, 58, 103, 105, 106, 108, 149, 351/154
  See application file for complete search history.

(56) References Cited

U.S. PATENT DOCUMENTS

| | | |
|---|---|---|
| 6,464,352 B1 | 10/2002 | Xie |
| 6,478,420 B2 | 11/2002 | Xiang |
| 6,502,939 B2 | 1/2003 | Vignato |
| 6,533,411 B1 | 3/2003 | Chen et al. |
| 6,550,913 B2 | 4/2003 | Zelman |
| 6,655,799 B1 | 12/2003 | Chen |
| 6,755,522 B1 | 6/2004 | Strenk |
| 6,883,912 B1 | 4/2005 | Madison |
| 7,011,402 B2 | 3/2006 | Shapiro |
| 7,971,993 B2 | 7/2011 | Kawamoto |
| D684,942 S | 6/2013 | Zelazowski |
| 2001/0009450 A1 | 7/2001 | Da Via |
| 2002/0080325 A1 | 6/2002 | Xiang |
| 2007/0013863 A1 | 1/2007 | Zelazowski |

FOREIGN PATENT DOCUMENTS

| | | |
|---|---|---|
| JP | 2001133740 | 5/2001 |
| WO | 2004090616 | 10/2004 |

OTHER PUBLICATIONS http://www.hilco.com/optometry/catalog.aspx?CategoryID=70&ParentCategoryID=4&,CategoryName=SunClips&ParentCatName=Sunwear, 1 page, publicly available as of Sep. 17, 2013.

http://www.kleargo.com/products/category/clips_ons_amp_fit_overs, 2 pages, publicly available as of Sep. 17, 2013.

https://sites.google.com/site/sunclipies/, 1 page, publicly available as of Sep. 17, 2013.

http://www.sunclipexpress.ca/, 3 pages, publicly available as of Sep. 17, 2013.

http://www.profiloclip-on.com/en/products.html, 1 page, publicly available as of Sep. 17, 2013.

http://www.audacelunettes.com/colorclip.aspx, 1 page, publicly available as of Sep. 17, 2013.

http://www.clipon.com/, 1 page, publicly available as of Sep. 17, 2013.

http://www.kleargo.com/products/rimless_bridge_tailor_clip, 1 page, publicly available as of Sep. 17, 2013.

http://www.cliponguys.com/clip-on-sunglasses-101.php, 2 pages, publicly available as of Sep. 17, 2013.

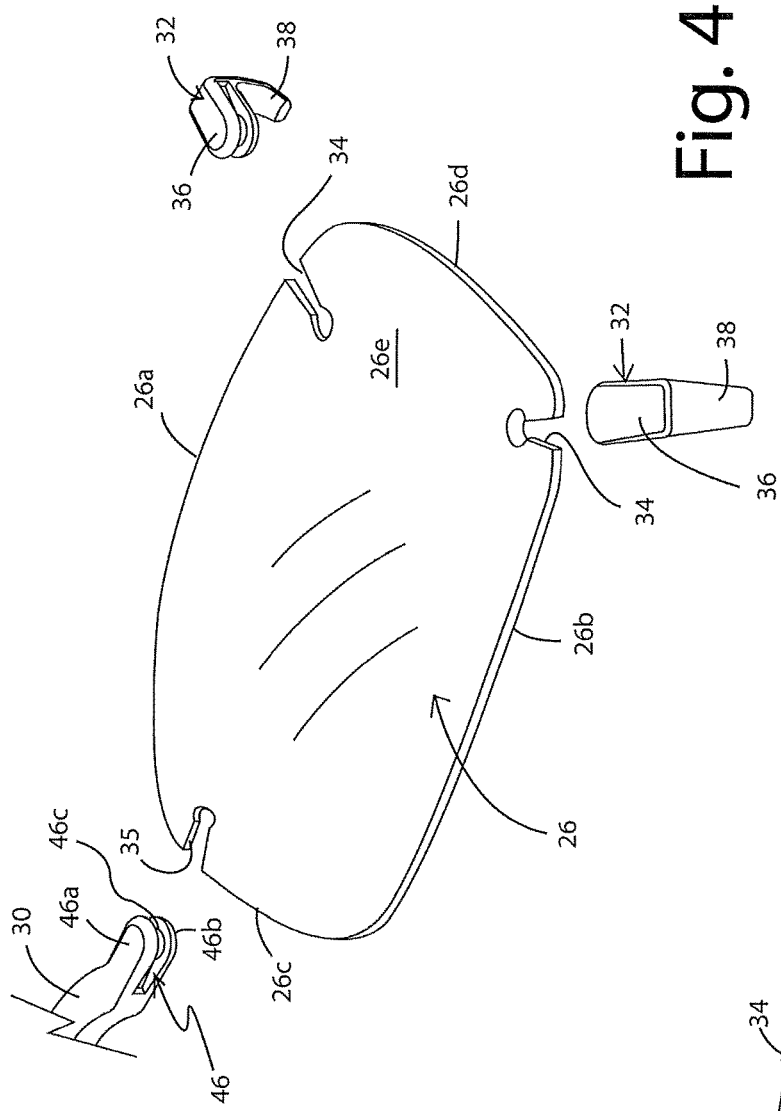
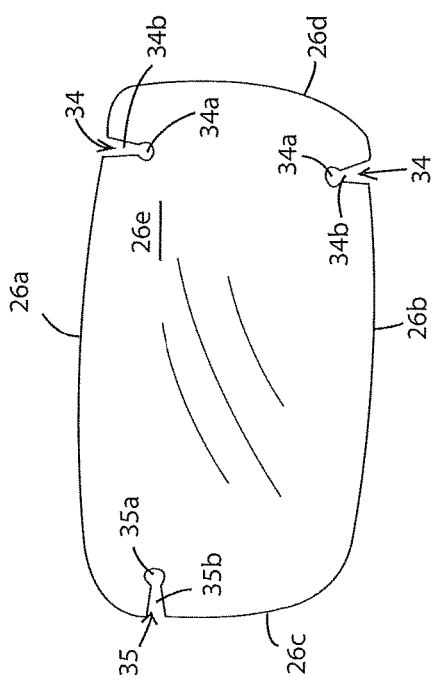
Fig. 4
Fig. 4a

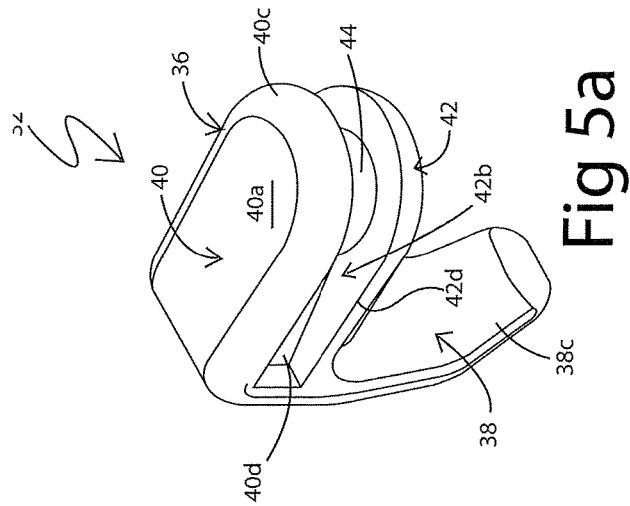
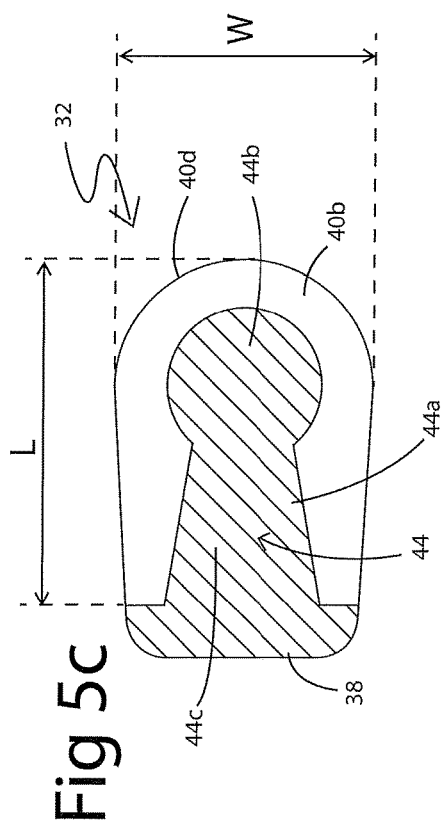
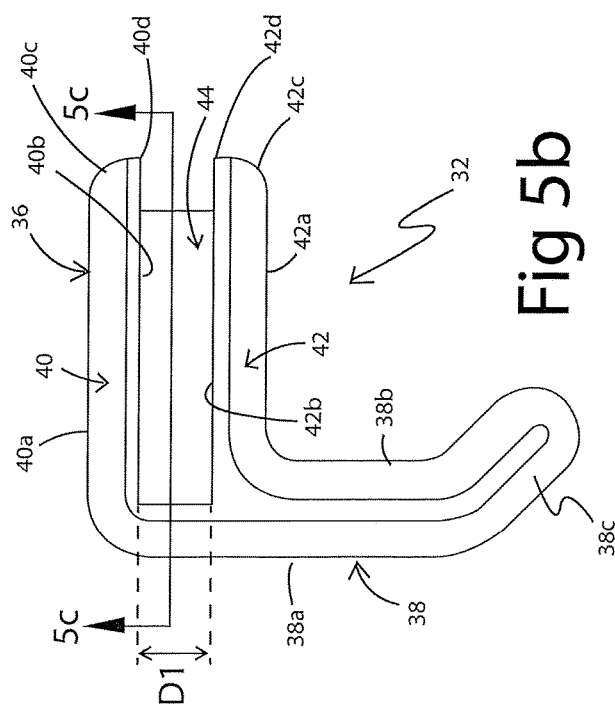

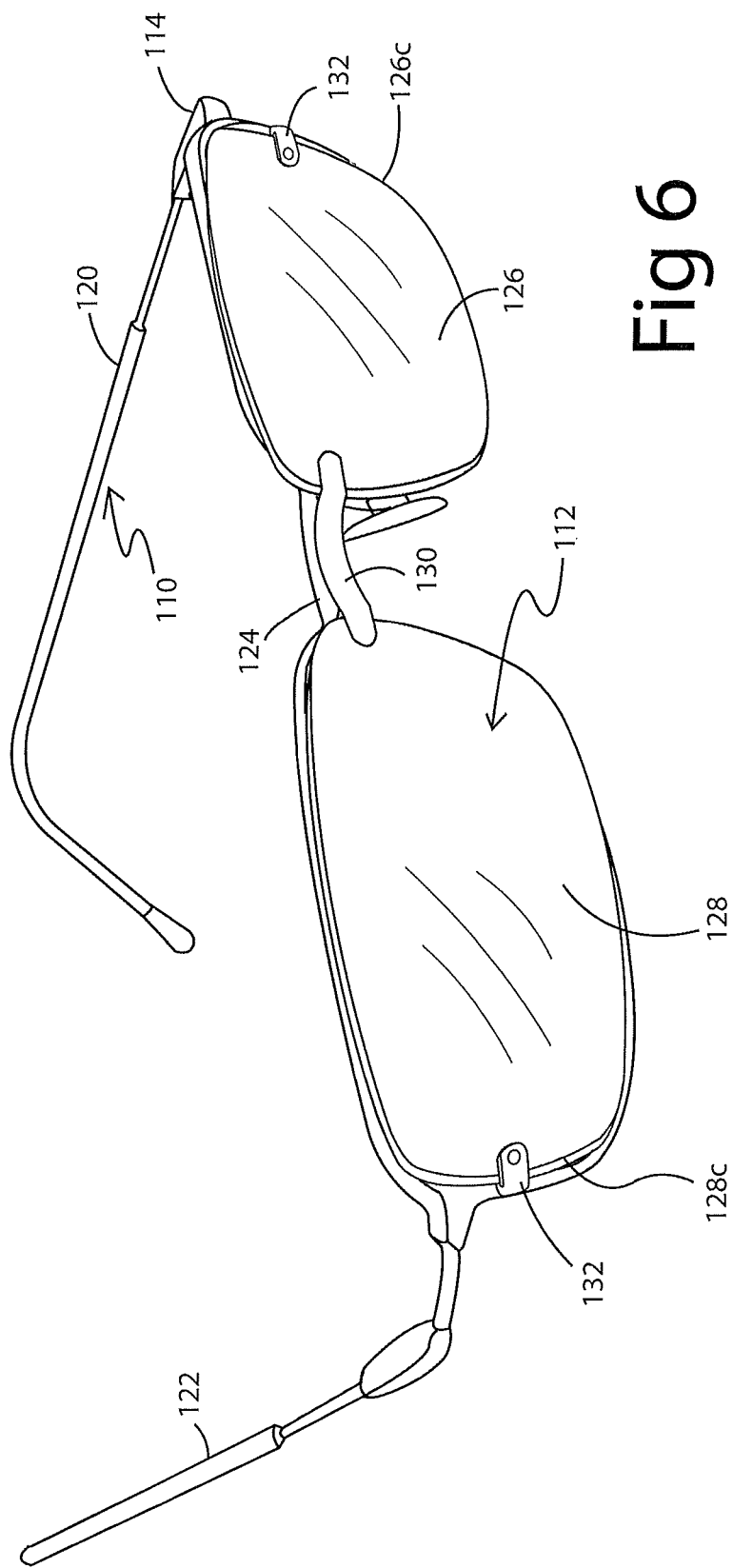

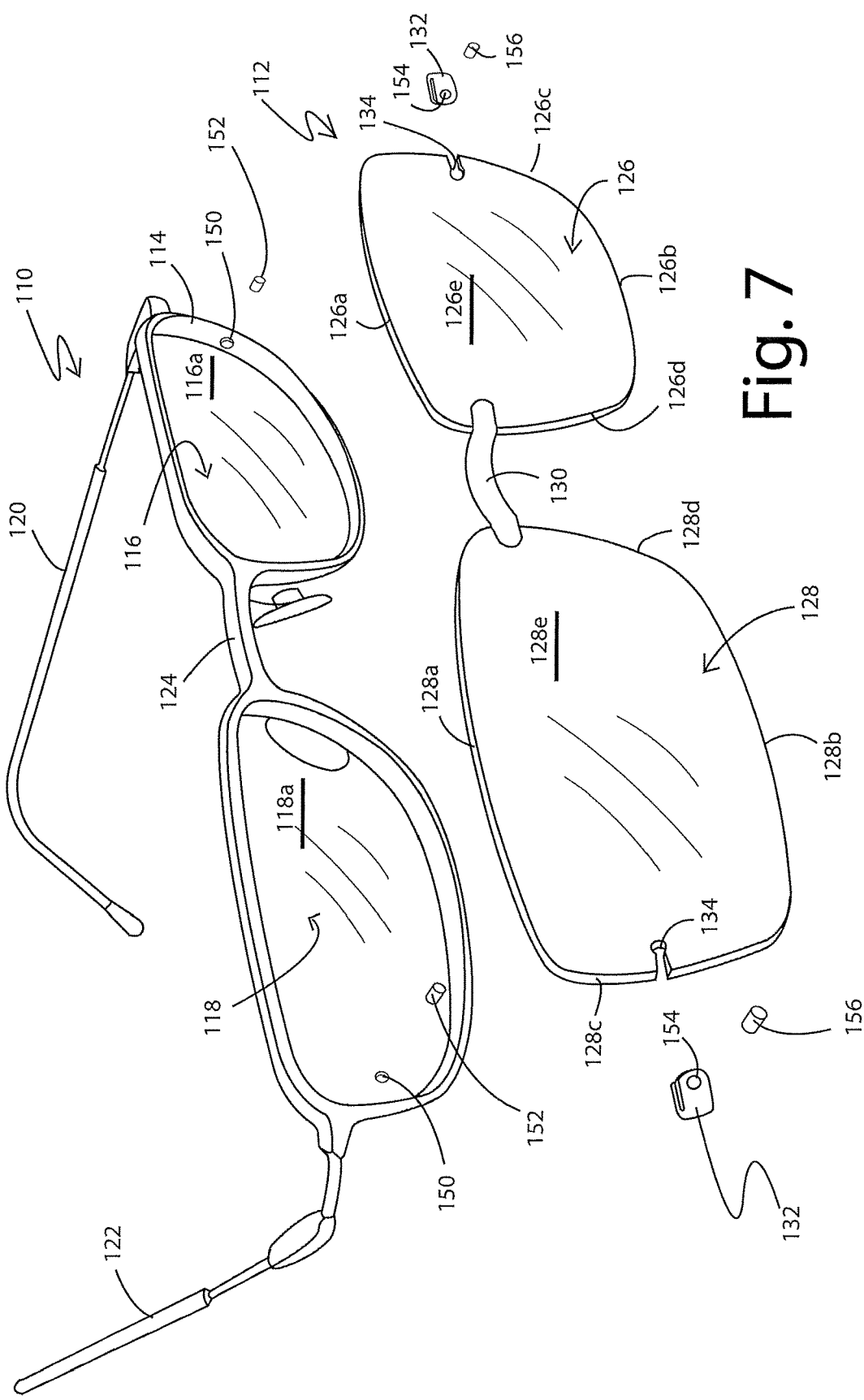

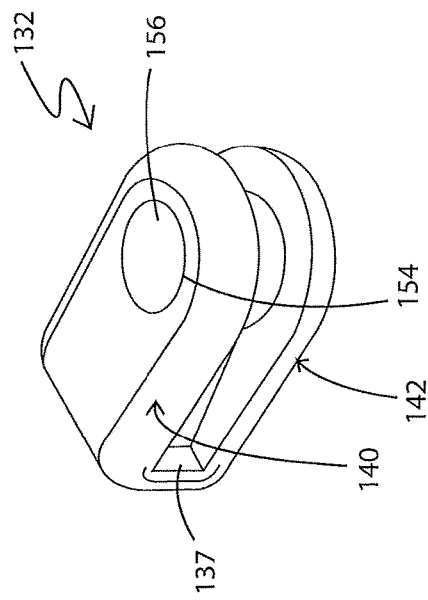
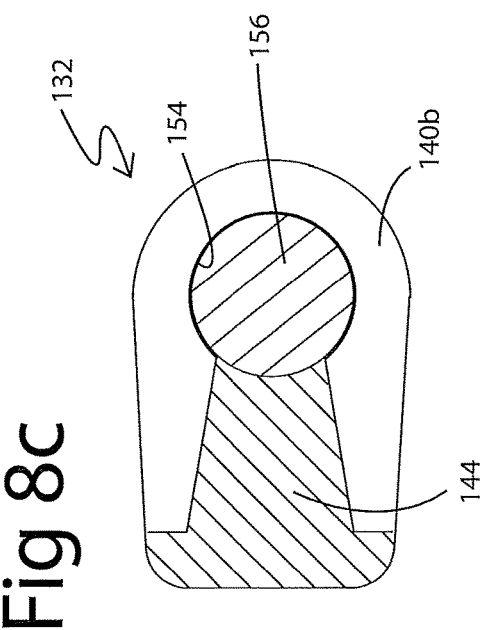
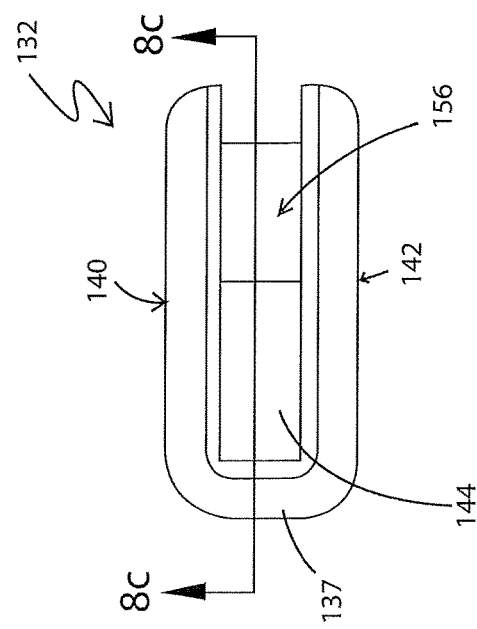
Fig 8a
Fig 8b
Fig 8c

EYEGLASS SYSTEM AND METHOD OF ENGAGEMENT

CROSS-REFERENCE TO RELATED APPLICATIONS

This is a Continuation-in-Part of U.S. patent application Ser. No. 14/933,408, filed Nov. 5, 2015 that is due to be issued on Jul. 18, 2017 as U.S. Pat. No. 9,709,805, which is a divisional of U.S. patent application Ser. No. 14/030,382 filed Sep. 18, 2013, now U.S. Pat. No. 9,188,797, the entire disclosures of which are incorporated herein by reference.

BACKGROUND

Technical Field

This disclosure relates generally to eyeglasses. More particularly, this disclosure is directed to eyeglass systems that include clip-on type sunglasses. Specifically, the present disclosure is directed to an eyeglass system where at least one keyhole-shaped aperture is defined in each lens of an auxiliary pair of sunglasses; and a connector with a complementary shaped boss is snap-fitted into the aperture; and the connector is then used to detachably engage the auxiliary glasses to a primary pair of prescription glasses.

Background Information

Removable auxiliary glasses for sun protection are a common substitute for prescription sunglasses as they allow users to wear their prescription glasses but offer a lower cost than would be the case if they purchased prescription sunglasses. The auxiliary glasses also enable users to own multiple pairs of sunglasses simply by replacing one clip-on set with another. Stock clip-on sunglasses are readily available but typically do not fit existing frames well. Furthermore, they tend to come in limited colors of lenses and chassis. Custom-made clip-on sunglasses are readily available at higher cost than stock clip-on sunglasses. These more expensive clip-ons are customized in a variety of ways and are attachable to existing prescription glasses in a variety of ways. Most of these attachment systems require special components to be made to order by the supplier. They tend to be difficult for an optician or optometrist to assemble and many are not durable. Some of the currently known attachment mechanisms include:
1) Magnets, such as is utilized in the auxiliary glasses sold by Eyenavision, Inc. at their website http://eyenavision.com/products/sunlenses;
2) Clips, such as the auxiliary glasses sold:
   a) under the Hilco® name at http://www.hilco.com/optometry/cataloq.aspx?CategoryID=70&ParentCategoryID=4&CategoryName=SunClips&ParentCatName=Sunwear;
   b) by Kleargo Inc. at http://www.kleargo.com/products/category/clips_ons_amp_fit_overs;
   c) by Sunclipies at https://sites.google.com/site/sunclipies/;
   d) by Sunclip Express at http://www.sunclipexpress.ca/;
   e) by Profilo at http://www.profiloclip-on.com/en/products.html;
   f) by Audace Lunettes at http://vvww.audacelunettes.com/colorclip.aspx;
3) Pinch grips such as those sold by Eclips at the website: http://www.clipon.com/; and
4) Bridge clips such as those sold by Kleargo Inc. at http://www.kleargo.com/products/rimless_bridge_tailor_clip or by the Insight Group Inc. at http://wwvv.cliponguys.com/clip-on-sunglasses-101.php.

There are also a number of patents that have been issues for different eyeglass systems which include a pair of primary glasses and a pair of auxiliary glasses. The primary glasses typically are prescription glasses and the auxiliary glasses are sunglasses. The auxiliary glasses are configured to be detachably engaged with the primary glasses. The primary glasses typically include a frame which has two regions for mounting of the lenses, a bridge which connects the two regions or the two lenses together (particularly in rimless glasses); and arms connected via elbows to the respective regions and used for seating the frame on the user's head.

The auxiliary glasses include two lenses connected by a bridge. Frequently, the auxiliary glasses are frame free but they may include a frame that has regions for mounting the lenses and a bridge operatively connecting the regions. Usually, the auxiliary glasses are free of arms for seating the glasses on a user's head.

A number of prior art patents are referenced herein which disclose structures and methods of securing the primary and auxiliary glasses together. For ease of description all of the prescription glasses referred to in this specification will be identified by the term "primary glasses" and all of the detachable sunglasses will be identified by the term "auxiliary glasses".

U.S. Pat. No. 6,341,864 (Ng) discloses auxiliary glasses which include clips for securing them to primary glasses. Each clip includes a base with first and second arms extending outwardly therefrom. In a first embodiment, the first and second arms extend outwardly from the base in the same direction, are substantially parallel to each other, and are spaced a distance apart. An inner surface of the base is positioned adjacent an exterior surface of the auxiliary lens. The first arm extends outwardly from the inner surface and through a hole defined in the auxiliary lens. The first arm is disposed at right angles to the exterior surface of the lens. The hole is spaced a distance inwardly away from the peripheral edge of the auxiliary lens. The first arm is cylindrical in shape and includes a bulbous terminal end which prevents it from being withdrawn from the hole once pushed therethroug h. The second arm is longer than the first and is substantially J-shaped with a straight first section thereof disposed generally at right angles to an exterior surface of the lens and parallel to the first arm. The second arm extends outwardly from the inner surface of the base and is disposed parallel to the peripheral edge of the lens. The second arm extends for a distance beyond the interior surface of the auxiliary lens and the curves back toward the same. A space is thus defined between a terminal end of the curved second section and the interior surface of the auxiliary lens. One of the lenses of the primary glasses is received in this space and the hooked terminal end of the clip keeps the glasses lens adjacent the auxiliary lens. In a second embodiment, the first and second arms extend outwardly from the base in opposite directions. An outer surface of the base is disposed adjacent the interior surface of the auxiliary lens and the cylindrical first arm extends forwardly through the hole in the auxiliary lens. The bulbous terminal end of the first arm is thus disposed adjacent the exterior surface of the auxiliary lens. The second arm curves rearwardly from the base and has a terminal end that is generally parallel to the inner surface of the base and is spaced a distance away therefrom. The lens from the primary glasses is captured in this space.

U.S. Pat. No. 6,478,420 (Xiang) discloses a set of auxiliary glasses which are releasably secured to primary glasses by magnets. The auxiliary glasses have apertures defined in them and a magnet is embedded in each aperture. The primary glasses include arms which are used to seat them on a user's head. Each arm is secured via an elbow to one of the lenses by way of a screw; and at least a head of this screw is made of a magnetic material. The apertures in the auxiliary glasses are positioned so as to align with the heads of these screws. Magnetic attraction between the embedded magnets and the magnetic screws keeps the auxiliary glasses engaged with the primary glasses. Instead of embedding the magnets in the auxiliary glasses, the patent also discloses that the magnets may be positioned within magnet holders prior to insertion of the same into the apertures. The holders are disclosed as being two separate nesting components that have opposing ledges which will be disposed adjacent opposite surfaces of the lenses. Multiple sets of magnets on the primary glasses and auxiliary glasses may be utilized and this may include magnets on the two bridges.

U.S. Pat. No. 6,464,352 (Xie) discloses a connector mechanism comprises two resilient fingers which extend inwardly from the bridge on the auxiliary glasses and hook over the bridge on the primary glasses. The resilient fingers are substantially J-shaped projections which include compression springs and form part of the actual bridge on the auxiliary glasses. A hole is defined in each auxiliary lens and a bolt extends through the hole and into a region of the bridge. The fingers extend over a top edge of the bridge on the primary glasses and they tend to pull the primary glasses toward the bridge on the auxiliary glasses.

U.S. Pat. No. 6,502,939 (Viganto) discloses a system in which the primary glasses are provided with threadably-engaged projections which extend outwardly from the exterior surface of each lens at either end of the bridge. The projections are complementary to recessed regions on the interior surfaces of the auxiliary lenses. When the auxiliary glasses are positioned proximate the primary glasses, the projections snap-fit into the recessed regions, thereby keeping the two pairs of glasses engaged with each other.

U.S. Pat. No. 6,533,411 (Chen et al) discloses a U-shaped coupling unit which is engaged with the auxiliary glasses by two mounting units. The coupling unit hooks onto the bridge of the primary glasses and keeps them engaged with the auxiliary glasses. Each mounting unit includes a base with a pair of spaced apart parallel arms that extend outwardly from the base in the same direction. The arms define a space between them and the peripheral edge of the auxiliary lens is received into this space. A bolt passes through a first aperture in one of the arms and then into a hole defined in the auxiliary lens to secure the mounting unit to the lens. A threaded shaft on the coupling unit passes through a second aperture in an extension of the other arm of the mounting unit to secure the coupling unit to the mounting unit.

U.S. Pat. No. 6,550,913 (Zelman) discloses auxiliary glasses which include extensions that are aligned with the arms of the primary glasses. Each of the extensions and the arms includes a magnet and the magnets are aligned with each other and attract each other when the auxiliary glasses are positioned in front of the primary glasses. In an alternative embodiment magnets are provided in each bridge and when the bridges are juxtaposed, the magnets attract each other and keep the primary and auxiliary glasses engaged. In this second embodiment, a simple L-shaped clip also extends from the top edge of the frame of the auxiliary glasses to hook over the top edge of the primary glasses' frame.

U.S. Pat. No. 6,655,799 (Chen) discloses providing holes in the auxiliary lenses which will align with holes in the primary lenses. A ferromagnetic stud extends through each hole and these studs attract each other when the lenses are brought into proximity with each other.

Strenk (U.S. Pat. No. 6,755,522) discloses providing an extension on the frame of the auxiliary glasses adjacent the outer side of each lens and a magnet in the extension. Magnets are also provided on the elbows of the frame of the primary glasses which connect the arms thereto. The magnets in the extensions and on the elbows are attracted to each other when the auxiliary glasses are brought into the proximity of the primary glasses. In a second embodiment magnets are received in mounting elements disposed in holes in the lenses of the primary glasses and these embedded magnets magnetically attract the magnets in the extensions on the auxiliary glasses.

Madison (U.S. Pat. No. 6,883,912) discloses providing magnets in various locations in extensions on the frames of the auxiliary and primary glasses. The magnets in the two pairs of glasses are positioned so as to align and thereby attract each other to retain the auxiliary glasses adjacent the primary glasses.

U.S. Pat. No. 7,011,402 (Shapiro) discloses using a fastener that includes at least one plastic prong to secure the auxiliary glasses and primary glasses together. The prong includes bushings which extend into openings defined by the inner lenses. The glasses also include end portions which are suitable for attaching an arm thereto. A magnet is provided in the end portions. A support arm connects the prong with the end portion.

U.S. Pat. No. D684,942 (Zelazowksi) discloses a magnet which is generally circular when viewed from either end and includes an annular groove which is disposed intermediate two annular ribs.

While all of the above connector mechanisms function for the purposes for which they were intended, there is still a need in the art for an improved way of detachably engaging a pair of auxiliary glasses to a pair of primary eyeglasses.

SUMMARY

An eyeglass system including primary glasses and detachably engageable auxiliary glasses is disclosed. The auxiliary glasses include a first and second auxiliary lens connected together by a bridge. Each lens has an exterior surface, an interior surface, and a peripheral edge extending between the interior and exterior surfaces. An aperture is defined in each of the lenses and extends between the interior and exterior surfaces. The aperture originates in the peripheral edge of the lens and extends for a distance into the body of the lens. A connector is engaged in the aperture in each of the lenses and this connector detachably engages the primary glasses. Preferably, the aperture is keyhole-shaped and the connector includes a boss that is a complementary keyhole shape.

The alternative design utilizes a magnet mounted into the hole of the keyhole connector. This magnet can then be used to hold the auxiliary glasses onto the primary glasses that have a piece of metal or another magnet mounted on them.

This system may be used to attach removable lenses such as tinted or polarized lenses, reading lenses or protective lenses to eyewear.

In one aspect, the present disclosure may provide an eyeglass system comprising a pair of primary glasses adapted to be detachably engaged with a pair of auxiliary glasses; wherein the pair of primary glasses comprises a frame having a first lens holding region and a second lens holding region and a bridge operatively connecting the first and second lens holding regions to each other; wherein the frame further comprises a first leg extending outwardly from the first lens holding region; and a second leg extending outwardly from the second lens holding region; a first primary lens and a second primary lens; each of the first and second primary lenses including an exterior surface, an interior surface, and a peripheral edge extending between the interior and exterior surfaces; wherein the first primary lens is retained in the first lens holding region and the second primary lens is retained in the second lens holding region; an aperture defined in each of the first and second primary lenses, where the aperture extends between the interior and exterior surfaces thereof, wherein the aperture originates in the peripheral edge and extends for a distance into the respective auxiliary lens; a connector engaged in the aperture of each of the first and second primary lenses; wherein the connectors are adapted to detachably engage the pair of primary glasses and the pair of primary glasses together; wherein each connector has a first arm and a second arm; wherein the first and second arms are disposed parallel to and spaced apart from each other; and a boss extends between the first and second arms; and wherein the boss is complementary shaped to the aperture and is received therein; and wherein each connector defines a hole therein, said hole extending from an exterior surface of the second arm through a portion of the boss and to at least an interior surface of the first arm; and wherein an insert is engaged in the hole.

In one aspect, the present disclosure may provide a pair of primary glasses for selective engagement with a pair of auxiliary glasses; wherein the primary glasses comprise a first lens region adapted to be positioned adjacent a first lens of the pair of auxiliary glasses; a second lens region adapted to be positioned adjacent a second lens of the pair of auxiliary glasses; wherein each of the first and second lens regions has an exterior surface, an interior surface, and a peripheral edge extending between the interior and exterior surfaces; an aperture defined in each of the first and second lens regions; where the aperture extends between the interior and exterior surfaces thereof, wherein the aperture originates in the peripheral edge and extends for a distance into the respective one of the first and second lens regions; a connector engaged in the aperture of each of the first and second lens regions; wherein the connectors are adapted to detachably engage the pair of primary glasses to the pair of auxiliary glasses; wherein each connector has a first arm and a second arm and the first and second arms are disposed parallel to and spaced apart from each other; and a boss extends between the first and second arms; and wherein the boss is complementary shaped to the aperture and is received therein, and wherein each connector defines a hole therein, said hole extending from an exterior surface of the second arm through a portion of the boss and to at least an interior surface of the first arm; and wherein an insert is engaged in the hole.

In one aspect, the present disclosure may provide A pair of primary glasses for selective engagement with a pair of auxiliary glasses; wherein the primary glasses comprise a first lens region adapted to be positioned adjacent a first lens of the pair of auxiliary glasses; a second lens region adapted to be positioned adjacent a second lens of the pair of auxiliary glasses; wherein each of the first and second lens regions has an exterior surface, an interior surface, and a peripheral edge extending between the interior and exterior surfaces; an aperture defined in each of the first and second lens regions; where the aperture extends between the interior and exterior surfaces thereof, wherein the aperture originates in the peripheral edge and extends for a distance into the respective one of the first and second lens regions; a connector engaged in the aperture of each of the first and second lens regions; wherein the connectors are adapted to detachably engage the pair of primary glasses to the pair of auxiliary glasses; wherein each connector has a first arm and a second arm and the first and second arms are disposed parallel to and spaced apart from each other; and a boss extends between the first and second arms; and wherein the boss is complementary shaped to the aperture and is received therein; and wherein each of the first and second arms of each connector includes a bevel proximate an outer edge thereof; and the boss is recessed relative to the bevel.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4 is an exploded perspective top view of one of the auxiliary lenses of the auxiliary glasses with the connectors and a portion of the bridge exploded away therefrom;

FIG. 4a is a top view of the lens shown in FIG. 4

FIG. 5a is a perspective view of a connector;

FIG. 5b is a side view of the connector;

FIG. 5c is a cross-sectional view of the connector taken along line 5c-5c of FIG. 5b;

FIG. 6 is a perspective front view of a second embodiment of the eyeglass system in which magnets are used to engage the auxiliary glasses and primary glasses together;

FIG. 7 is a perspective front view of the eyeglass system of FIG. 6 showing the auxiliary glasses disengaged from the primary glasses and showing the component magnets and connectors exploded away from the primary and auxiliary glasses;

FIG. 8a is a perspective view of a connector used in the second embodiment;

FIG. 8b is a side view of the connector;

FIG. 8c is a cross-sectional view of the connector taken along line 8c-8c of FIG. 8b;

Similar numbers refer to similar parts throughout the drawings.

DETAILED DESCRIPTION

Figure 1:
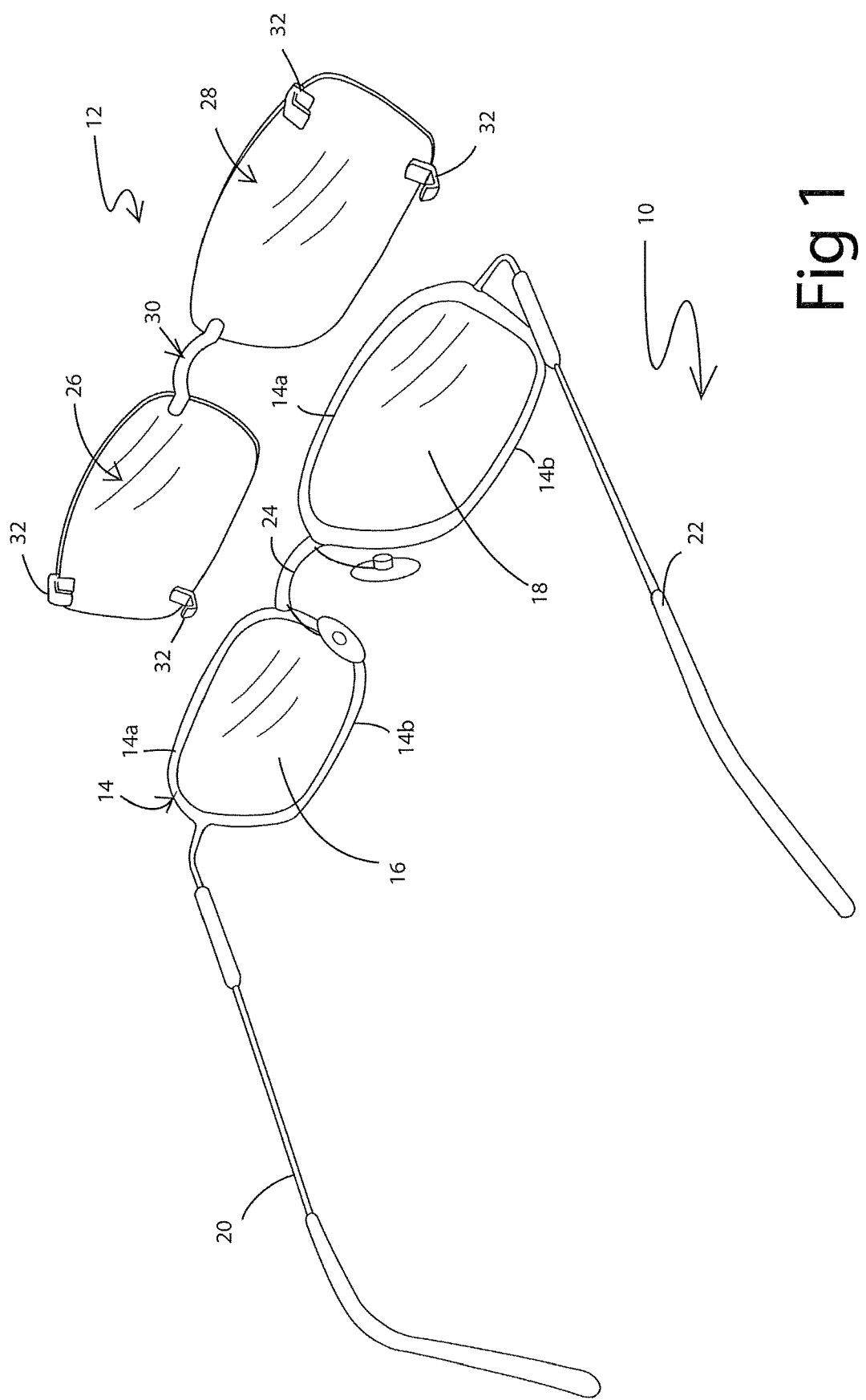
FIG. 1 is a perspective rear view of a pair of primary glasses with a first embodiment pair of a clip-on type auxiliary glasses shown detached from the primary glasses.

Referring to FIG. 1 and in accordance with an aspect of the present disclosure there is shown an eyeglass system comprising a pair of primary glasses 10 and a pair of auxiliary glasses 12. Primary glasses 10 include a frame 14 having a pair of lens mounting members (not numbered), a bridge 24 operatively connecting the lens mounting members together, and first and second arms 20, 22. Each arm 20, 22 is pivotally engaged with one of the lens mounting members and is used to seat frame 14 on a user's head. A first lens 16 and a second lens 18 are mounted into the lens mounting members. Preferably, although not necessarily, first and second lenses 16, 18 are prescription lenses.

Figure 2:
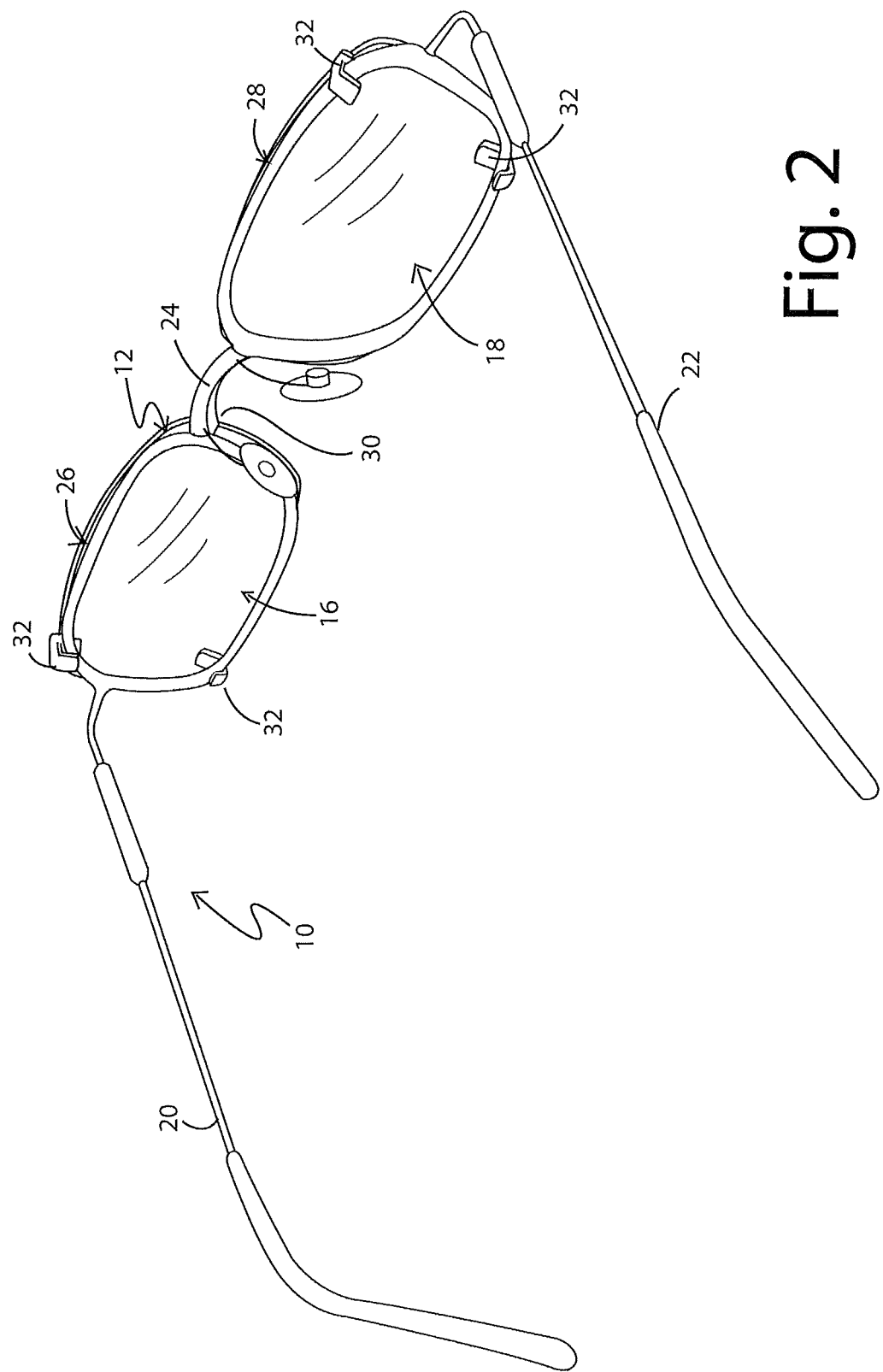
FIG. 2 is a perspective rear view of the primary glasses with the auxiliary glasses engaged therewith.
Figure 3:
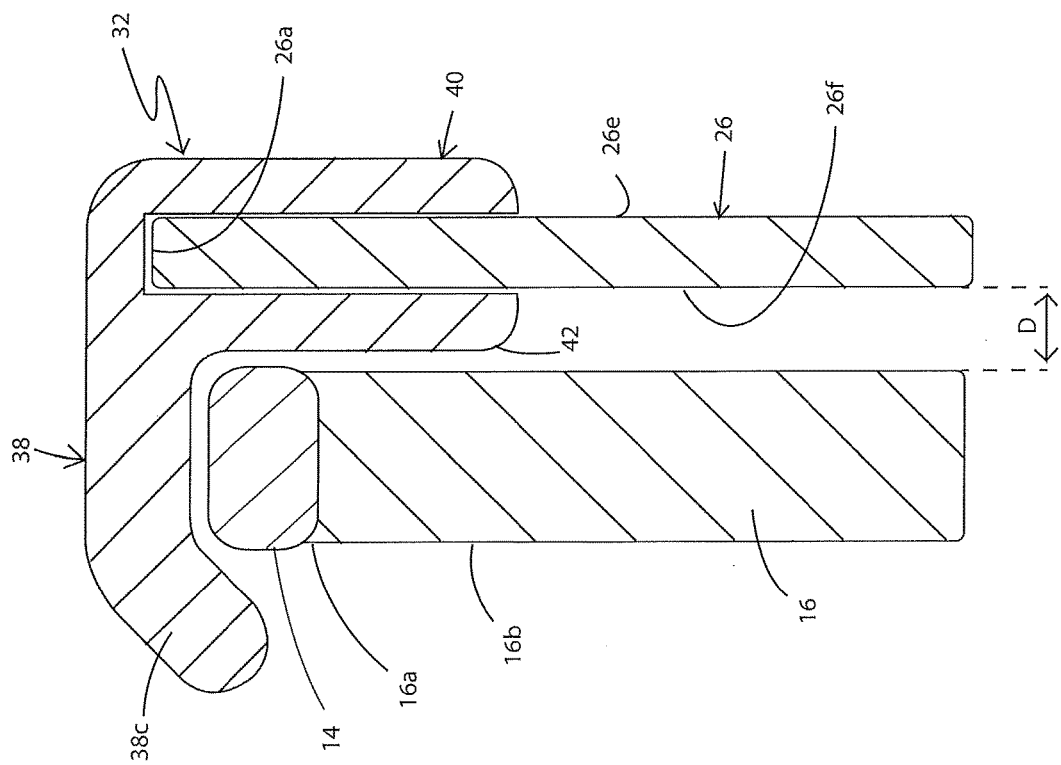
FIG. 3 is an enlarged cross-sectional right side view of a top region of the auxiliary glasses engaged with a region of the primary glasses.

Auxiliary glasses 12 include a first lens 26 and a second lens 28 which are secured to each other by an auxiliary bridge 30. FIG. 1 illustrates auxiliary glasses 1 as being frame free, apart from the presence of a bridge 30. It will be understood, however, that a frame could be provided on auxiliary glasses 12. A plurality of connectors 32 is provided on first lens 26 and on second lens 28. Connectors 32 are configured to engage primary glasses 10 and keep auxiliary glasses 12 secured thereto, as is illustrated in FIG. 2. FIG. 3 shows a region of lens 16 with a region of auxiliary lens 26 disposed a spaced distance "D" in front of lens 16. Connector 32 is illustrated as being located proximate a top end 26a of auxiliary lens 26 and at least a portion of connector 32 passes over top end 16a of lens 16 and angles downwardly for a distance behind rear surface 16b of lens 16.

FIG. 4 illustrates one of the lenses 26 of auxiliary glasses 12 in greater detail. It will be understood that the other lens 28 is similarly configured and is a mirror image of lens 26. Lens 26 has a top end 26a, a bottom end 26b, a first side 26c and a second side 26d. Lens 26 also has an exterior surface 26e and an interior surface 26f (FIG. 3). Top end 26a, bottom end 26b, first side 26c and second side 26d form a peripheral edge of lens 26. At least one, and preferably three, apertures 34, 35 are defined in lens 26. As shown in FIG. 4a, auxiliary lens 26 preferably defines two connector apertures 34 and a bridge aperture 35. Each aperture 34, 35 extends between exterior surface 26e and interior surface 26f of lens 26. Furthermore, each aperture 34, 35 originates in the peripheral edge of lens 26 and extends for a distance into the body of the same.

In accordance with an aspect of the disclosure, apertures 34, 35 preferably are keyhole-shaped and include a generally circular first region 34a, 35a (FIG. 4a) and a generally trapezoidal second region 34b, 35b. Second regions 34b, 35b originate in the peripheral edge of lens 26 and first region 34a, 35a is disposed a distance inwardly away from the peripheral edge. It will be understood that while this keyhole-shaped aperture is preferred, differently configured apertures that originate in the peripheral edge of the lens 26 and extend inwardly into the body of the lens may be utilized instead. Connectors 32 are engaged in apertures 34 and bridge 30 is engaged in aperture 35 as will be hereafter described. Connectors 32 are used to detachably engage auxiliary glasses 12 to primary glasses 10. Bridge 30 is used to secure auxiliary lens 26 to auxiliary lens 28.

It will be understood that lens 26 may be provided with only one aperture 34 or 35 defined therein, or may be provided with two apertures or more than three apertures. If only the bridge 30 is to be engaged in the manner disclosed herein, then only bridge aperture 35 will be defined in lens 26 and other types of connectors may be utilized to engage primary glasses 10 and auxiliary glasses 12 to each other. If only one connector 32 is going to be utilized to engage primary glasses 10 and auxiliary glasses 12 together, then only one aperture 34 will be defined in the peripheral edge of lens 26. The bridge and any other connectors utilized will be secured to auxiliary glasses 12 in some other manner. It will further be understood that more than two apertures 34 may be defined in lens 26 if more than two connectors 32 are utilized. Any combination of apertures 34, 35, bridge 30 and connectors 32 are contemplated for use in one aspect of the disclosure.

FIGS. 5a-5c show connector 32 in greater detail. Connector 32 includes a first leg 36 and a second leg 38 which are disposed generally at right angles to each other. First leg 36 comprises a first arm 40, a second arm 42 and a boss 44. First and second arms 40, 42 are generally identical in shape, are parallel to each other and spaced a distance "D1" (FIG. 5c) apart. In particular, first and second arms 40, 42 are disposed in spaced end-to-end relationship and are aligned with each other. What is meant by "spaced end-to-end" relationship is that the interior surface 40b of first arm 40 is disposed proximate the interior surface 42b of second arm 42 but the interior surfaces 40b, 42b are spaced from each other. Furthermore, referring to FIGS. 5a and 5c, the outer edges 40d, 42d are vertically aligned with each other.

First and second arms 40, 42 are an elongated D-shape when viewed from above (FIG. 5a). First arm 40 includes an exterior surface 40a and an interior surface 40b which meet at the outer edge 40d. Exterior surface 40a includes a curved or beveled region 40c proximate outer edge 40d to ensure that there are no sharp edges on connector 32 that could hurt the user.

Second arm 42 includes an exterior surface 42a and an interior surface 42b which meet at outer edge 42d. Once again, a beveled or curved region 42c is provided adjacent outer edge 42d on the exterior surface 42a. In this first embodiment of the eyeglass system, first arm 40 and second arm 42 are free of apertures that extend between their interior and exterior surfaces 40a, 40b and 42a, 42b, respectively.

Boss 44 originates in interior surface 40b and terminates in interior surface 42b and extends between interior surface 40b and interior surface 42b. Only a narrow lip of each interior surface 40b, 42b circumscribes boss 44. This lip can be seen in FIG. 5c as the region marked 40b which extends outwardly, particularly laterally outwardly, away from an exterior surface 44a of boss 44 to outer edge 40d of first arm 40. Second arm 42 has a similar lip formed between the exterior surface 44a of boss 44 and outer edge 42d of second arm 42. Boss 44 is thus recessed relative to the outer edges 40d, 42d of first and second arms 40, 42. The narrow lips of interior surfaces 40b, 42b are substantially planar (see FIG. 5b).

It should be noted that boss 44 is not a thin cylindrical member that is of a similar size, shape and length to that of a bolt. Instead, boss 44 includes a substantially circular first region 44b (FIG. 5c) and a second region 44c that is substantially trapezoidal in shape. Second region 44c extends outwardly from a section of the circumference of first region 44b. Second region 44c is substantially continuous with an upwardly extending region of second leg 38 and extends outwardly and forwardly away therefrom. Boss 44 extends for almost the entire width "W" and length "L" of first and second arms 40, 42, as can be seen in FIG. 5c. First arm 40, second arm 42 and boss 44 are integrally formed and connector 32 is a unitary component that preferably is molded from a material such as plastic.

In accordance with an aspect of the disclosure, boss 44 is complementary in shape to aperture 34. Thus, boss 44 preferably is keyhole shaped in cross-section so as to be complementary to the keyhole-shaped apertures 34 or 35. As is evident from FIG. 5c, the interior surface 40b extends outwardly for a distance beyond the exterior surface 44a of boss 44. Similarly, the interior surface 42b extends outwardly from a distance beyond exterior surface 44a. Boss 44 is thus effectively recessed between first and second arms 42, 44.

Second leg 38 is integrally formed with first leg 36 and extends generally perpendicularly outwardly from the ends of each of first and second arms 40, 42. Consequently, connector 32 is substantially F-shaped when viewed from the side (see FIG. 5b). Second leg 38 has an exterior surface 38a and an interior surface 38b. Terminal end 38c (FIGS. 3 and 5b) of second leg 38 is disposed at about a forty-five degree angle relative to a remaining portion of second leg 38.

Connector 32 is engaged with lens 26 by sliding boss 44 into the aperture 34 in top end 26a or into the aperture 34 in bottom end 26b. Because of the narrowing shape of the trapezoidal second region 34b of aperture 34 being engaged by the circular first region 44b of boss 44, a bit of force is required to get first region 44b of boss 44 to enter first region 34a of aperture 34. Once first region 44b of boss 44 enters first region 34a, the circular region of boss 44 cannot easily get past the corners forms where first region 34a transitions to second region 34b. Thus, connector 32 is snap-fitted into aperture 34. As shown in FIG. 3, when connector 32 is engaged in aperture 34, interior surface 40b of first arm 40 is disposed adjacent exterior surface 26e of lens 26 and interior surface 42b of second arm 42 is disposed adjacent interior surface 26f of lens 26. Boss 44 of connector 32 is wedged in aperture 34 and the top region of lens 26 is thus captured between first and second arms 40, 42 and extends transversely between the interior and exterior surfaces of the associated lens. The keyhole shape of boss 44 and aperture 34 is advantageous in that it substantially prevents connector 32 from accidentally sliding out of aperture 34 once engaged therein. It will be noted that when a first connector 32 is engaged in aperture 34 in top end 26a of lens 26 and a second connector 32 is engaged in aperture 34 in bottom end 26b of lens 26, the two terminal regions 38c of the two connectors are opposed and extend generally toward each other.

Figure 5D:
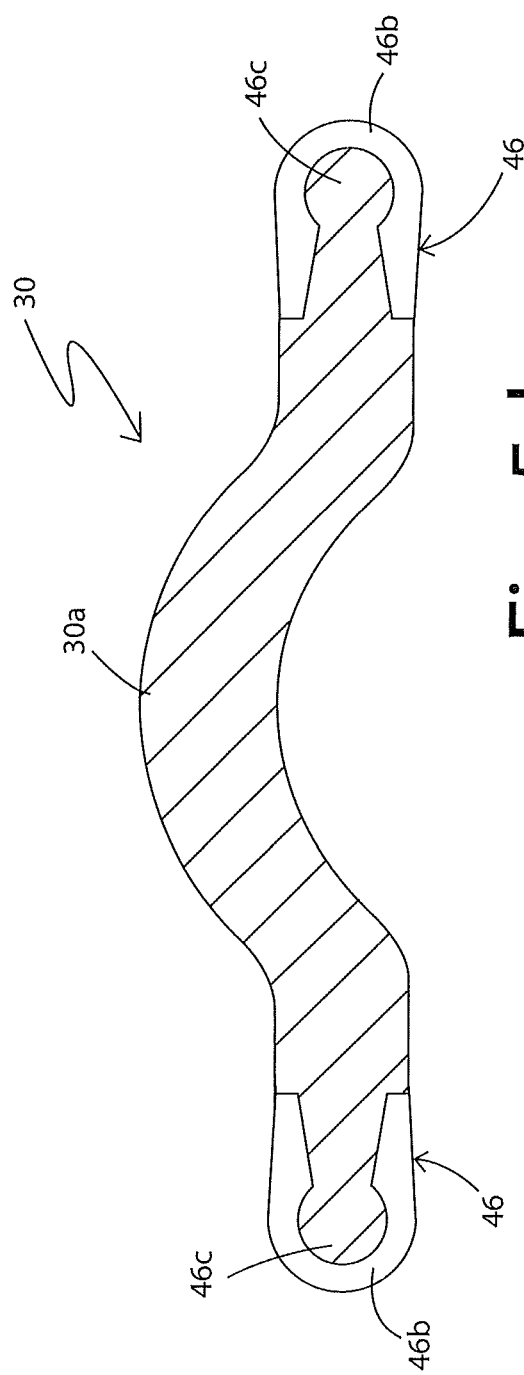
FIG. 5d is a longitudinal cross-sectional view of the auxiliary bridge.

FIGS. 4 and 5d show auxiliary bridge 30 in greater detail. Bridge 30 has a curved region 30a which is configured to pass over the bridge of the user's nose, and two connector regions 46, one at either end of curved region 30a. Each connector region 46 is configured to engage in aperture 35 of one of auxiliary lenses 26 and 28. Connector region 46 is substantially similar to first leg 36 of connectors 32 in that it includes a first arm 46a and a second arm 46b that are disposed substantially parallel and spaced apart from each other. A recessed boss 46c is disposed between first and second arms 46a, 46b and is integrally formed therewith. As best seen in FIG. 5d, boss 46c is keyhole-shaped and is complementary to bridge aperture 35 and is received therein. When both connector regions 46 are engaged in bridge apertures 35 in both of the first and second auxiliary lenses 26, 28, the bridge 30 secures lenses 26, 28 together.

The keyhole type attachment utilized in the eyeglass system in accordance with an aspect of the present disclosure allows an optician or optometrist to easily prepare a durable, custom pair of auxiliary glasses in a short period of time and at a relatively lower cost. The custom auxiliary lenses 26, 28 are cut to shape in the traditional way to fit the lenses 16, 18 of primary glasses 10 as desired. Then the optician or optometrist utilizes a simple hand die press to punch out the keyhole shape in the appropriate area of the lens to form apertures 34, 36 in order to attach the bridge 30 and two connectors 32 to the two auxiliary lenses 26, 28. The matching keyhole-shape boss 46c on each end of bridge 30 and boss 34 on each connector 32 snaps into the keyhole-shaped apertures 35, 34 on the auxiliary lens 26, 28.

Auxiliary glasses 12 are engaged with primary glasses 10 by positioning lens 26 adjacent lens 16, positioning lens 28 adjacent lens 18, and positioning auxiliary bridge 30 adjacent bridge 24. Integral to the connector 32 is second leg 38 which slightly flexes to snap over the top edge of primary glasses 10 to hold connector 32 in place on the lenses 16, 18 or over frame 14 of the primary glasses 10. The user will angle auxiliary glasses 12 so as to snap the upper connectors 32 at the top edges of lenses 26, 28 over upper rim 14a of frame 14, or to snap the lower connectors 32 at the bottom ends of lenses 26, 28 under lower rim 14b of frame 14. Once the terminal ends 38c of upper or lower connectors 32 are hooked behind the respective upper or lower rim 14a, 14b the opposite end of auxiliary glasses 12 is rotated inwardly to engage the other of the upper or lower connectors 32 to the other of the upper and lower rims 14a, 14b of frame 14. It will be understood that if the glasses are effectively frameless i.e., do not include regions of frame 14 which circumscribe lenses 16, 18, then auxiliary glasses 12 can be engaged directly to lenses 16, 18 in a substantially similar manner to that described above.

If it is desired to disengage auxiliary glasses 12 from primary glasses 10 the steps described above for engaging connectors 32 with frame 14 are simply reversed.

FIGS. 6-8c illustrate a second embodiment of auxiliary glasses in accordance with an aspect of the disclosure, generally indicated at 112. FIG. 6 shows auxiliary glasses 112 detachably engaged with a modified pair primary glasses 110. Primary glasses 110 include a frame 114 into which is mounted a pair of lenses 116, 118. Frame 114 also includes first and second arms 120, 122 which are utilized to seat frame 114 on a user's head. Frame 114 further includes a bridge 124 which extends between sections of frame 114 into which lenses 116, 118 are secured. In accordance with an aspect of the disclosure, a hole 150 is drilled or otherwise formed in each of lenses 116, 118, preferably a short distance inwardly of the outer side edges thereof and extending from an exterior surface 116a, 118a of the respective lens through to the interior surface (not shown) thereof. This can be seen in FIG. 7. A magnet 152 is inserted into each hole 150 and is secured therein by an adhesive or other suitable means.

Auxiliary glasses 112 include a first lens 126 and a second lens 128 which are secured to each other by a bridge 130. First lens 126 has a top end 126a, a bottom end 126b, a first side 126c, a second side 126d, an exterior surface 126e and an interior surface (not shown). Similarly, second lens 128 has a top end 128a, a bottom end 128b, a first side 128c, a second side 128d, an exterior surface 128e and an interior surface (not shown). An aperture 134 is defined in first side 126c and another aperture 134 is defined in first side 128c. Preferably, each of the apertures 134 is a keyhole-shaped aperture that is substantially identical to aperture 34. Apertures 134 are positioned so that they will be substantially aligned with holes 150 in lenses 116, 118 when auxiliary glasses 112 is engaged with glasses 110.

In accordance with an aspect of the disclosure, a second embodiment connector 132 is engaged along first side edge 126c of first lens 126 and another connector 132 is engaged along first side edge 128c of second lens 128. Connectors 132 are configured to magnetically engage glasses 110 and keep auxiliary glasses 112 secured thereto. FIGS. 8a-8c show connector 132 in greater detail. Connector 132 is similar to connector 32 but it is missing the second leg 38 thereof. Connector 132 is thus substantially C-shaped when viewed from the side and is comprised of a first leg 140 and a second leg 142 with a recessed boss 144 disposed therebetween. The boss 144 is substantially keyhole shaped so that it is complementary in size and shape to apertures 134. A region of boss 144 defines a hole 154 therein, preferably the region that will align with the circular region of aperture 134. A complementary shaped magnet 156 is inserted into this hole 154. Magnet 156 is adhered in place and preferably forms the circular region of the keyhole shaped boss 144. Magnet 156 extends from exterior surface 140a of first arm 140 through to exterior surface 142 of second arm 142. Magnet 156 is oriented so that when brought into the proximity of one of magnets 152 on glasses 110, magnet 156 will present an opposite pole to magnet 152. Consequently, the two magnets 156, 150 will be magnetically attracted to each other and auxiliary glasses 112 will thereby be retained on primary glasses 110. If it is desired to later disengage auxiliary glasses 112 from primary glasses 110, the user simply grasps the same and pulls the glasses 112 away from glasses 110. When magnets 156 exit the magnetic field of magnets 150, the attractive force is broken and the auxiliary glasses 112 are able to be separated from primary glasses 110.

Although not illustrated herein, it will be understood that bridge 130 of auxiliary glasses 112 could be fixed by an adhesive or some other manner to auxiliary lenses 126, 128; or bridge 130 could be secured to lenses 126, 128 in the same manner as bridge 30 is connected to lenses 26, 28. Still further, bridge 130 may be provided with magnets similar to the way in which connectors 132 include magnets 156 and bridge 124 on the primary glasses may be fabricated from a magnetic material or may have holes drilled into the same and magnets inserted therein. Thus, bridge 130 could be fabricated to be magnetically attracted to bridge 124 or magnets embedded in lenses 116, 118. Still further, magnets could be provided in the frame 114 instead of in the lenses 116, 118 of primary glasses 110 and these magnets would be aligned with the magnets 154 in connectors 132.

Figure 9:
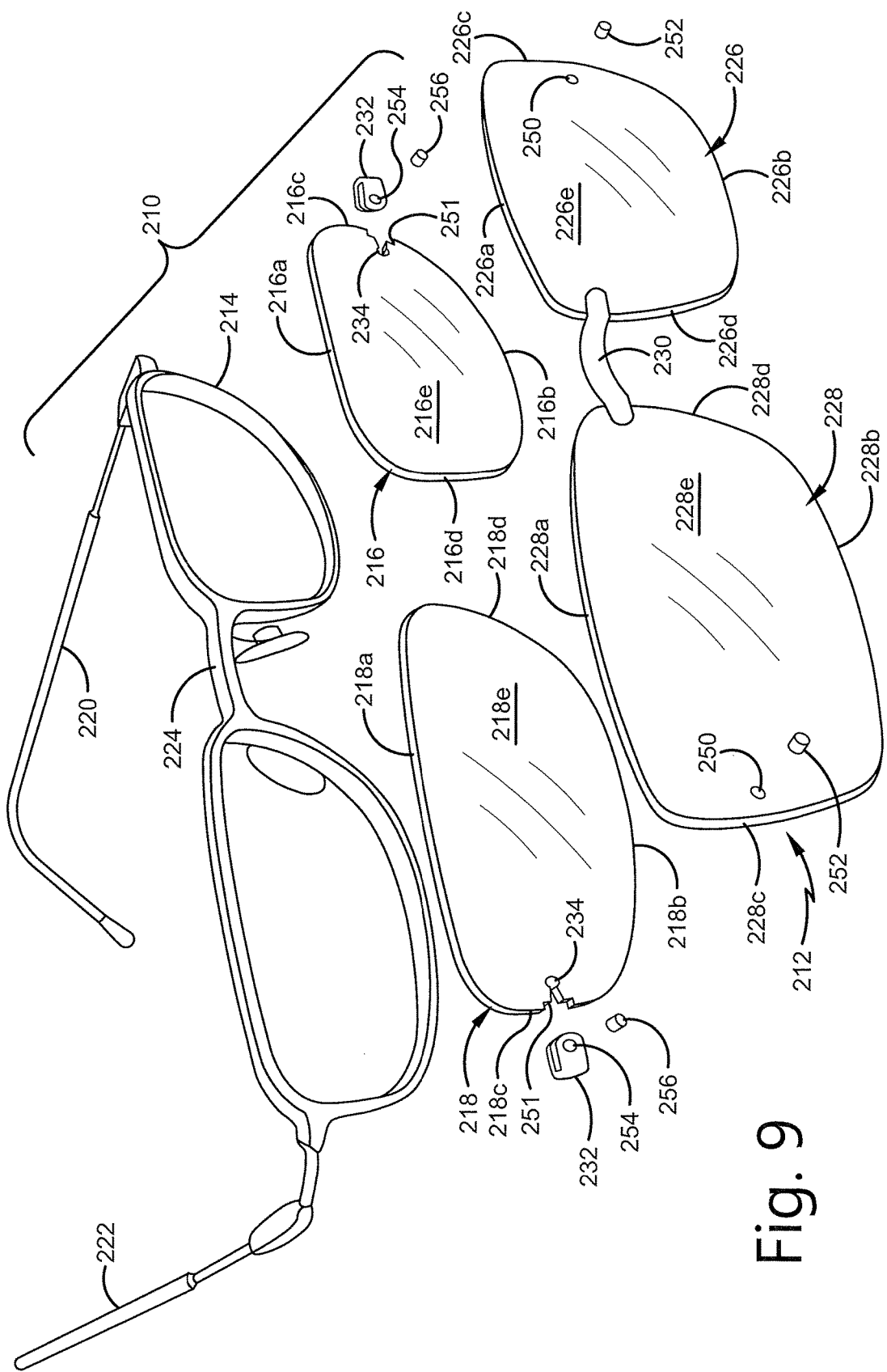
FIG. 9 is a partially exploded perspective front view of an alternative embodiment of the eyeglass system of FIG. 6, showing the auxiliary glasses disengaged from the primary glasses and the lenses of the primary glasses exploded from the primary glasses' frame.
Figure 10:
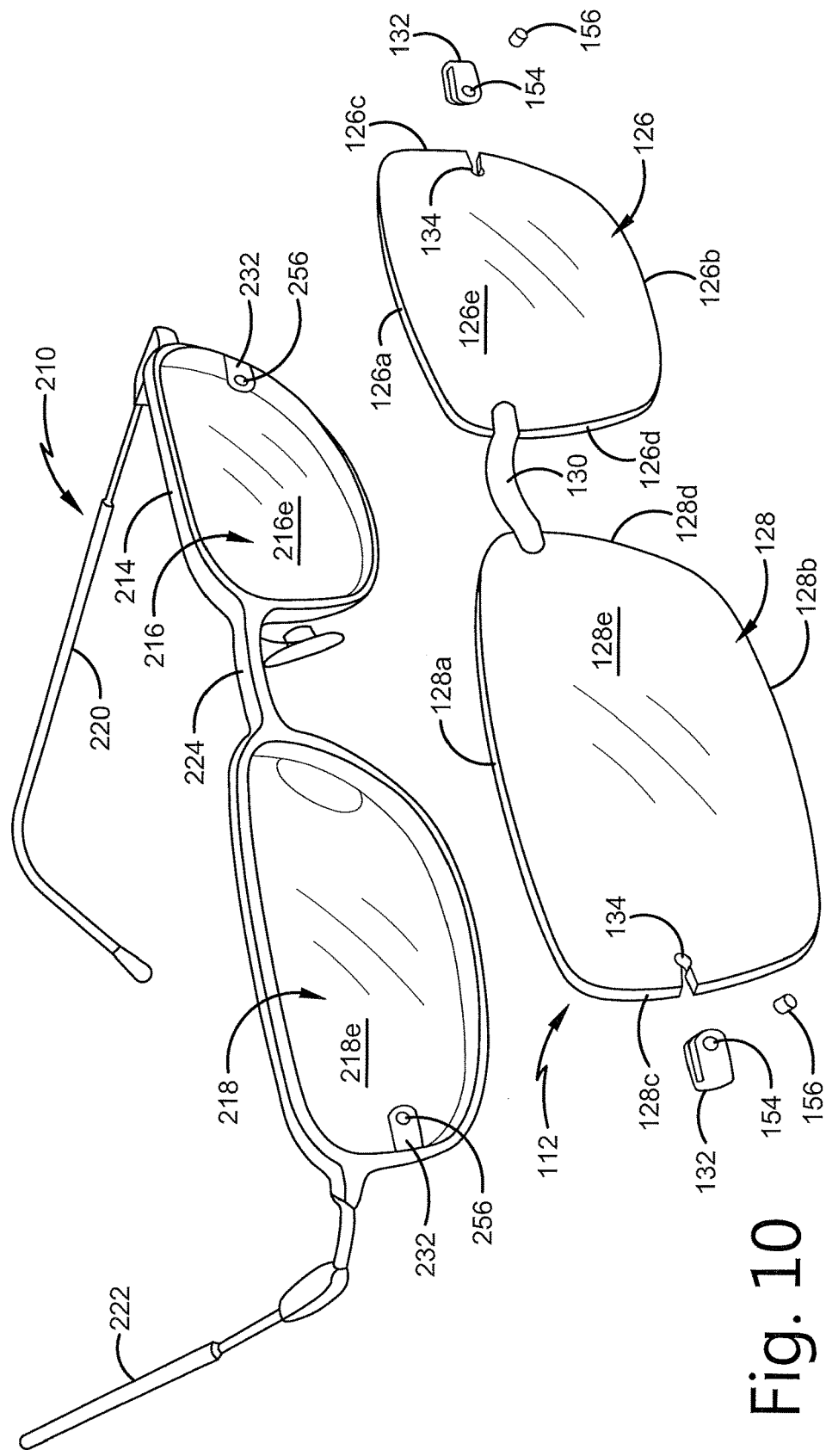
FIG. 10 is a perspective front view of a further alternative embodiment of the eyeglass system of FIG. 6, showing the auxiliary glasses disengaged from the primary glasses.

FIGS. 9 and 10 illustrate alternative embodiments of the primary glasses in accordance with an aspect of the disclosure, generally indicated at 210.

FIG. 9 shows auxiliary glasses 212 positioned for engagement with primary glasses 210. Primary glasses 210 include a frame 214 into which is mounted a pair of lenses 216, 218. Frame 214 also includes first and second arms 220, 222 which are utilized to seat frame 214 on a user's head. Frame 214 further includes a bridge 224 which extends between sections of frame 214 into which lenses 216, 218 are secured. First lens 216 has a top end 216a, a bottom end 216b, a first side 216c, a second side 226d, an exterior surface 226e and an interior surface (not shown). Similarly, second lens 218 has a top end 218a, a bottom end 218b, a first side 218c, a second side 218d, an exterior surface 218e and an interior surface (not shown). An aperture 234 is defined in first side 216c and another aperture 234 is defined in first side 218c. Preferably, each of the apertures 234 is a keyhole-shaped aperture that is substantially identical to aperture 34.

Auxiliary glasses 212 include a first lens 226 and a second lens 228 which are secured to each other by a bridge 230. (Auxiliary glasses 212 may alternatively be made in such a way that bridge 230 is omitted and the individual lenses 226, 228 may be replaced by a single, unitary, monolithic component that is shaped to form left and right lens members.)

Referring still to FIG. 9, first lens 226 has a top end 226a, a bottom end 226b, a first side 226c, a second side 226d, an exterior surface 226e and an interior surface (not shown). Similarly, second lens 228 has a top end 228a, a bottom end 228b, a first side 228c, a second side 228d, an exterior surface 228e and an interior surface (not shown).

In accordance with an aspect of the disclosure, a hole 250 is drilled or otherwise formed in each of lenses 226, 228. The hole 250 is shown as being located a short distance inwardly from the peripheral edge of the associated lens and extending from an exterior surface 226a, 228a of the respective lens through to the interior surface (not shown) thereof. The hole 250 may however be positioned such that it originates in the peripheral edge of the lens, is keyhole shaped and extends between the interior and exterior surfaces of the lens. In other words, the hole 250 may have a location and shape similar to one of the holes 34, 35 shown in FIG. 4. A magnet 252 may be inserted into each hole 250 and is secured therein by an adhesive or other suitable means. If the hole 250 is formed in the peripheral edge, placing the magnet 252 into the peripheral edge of the lens may also relieve stress and cracking that a hole with a magnet insert could possibly create in the lens.

Apertures 234 in lenses 216, 218 are positioned so that they will be substantially aligned with holes 250 in lenses 216, 218 when auxiliary glasses 212 are engaged with primary glasses 210.

A connector 232 is engaged along first side edge 216c of first lens 216 and another connector 232 is engaged along first side edge 218c of second lens 218. Connectors 232 may be substantially identical in structure and function to connectors 132 and are configured to magnetically secure primary glasses 210 and auxiliary glasses 212 together. Connectors 232, like connectors 132, are substantially C-shaped when viewed from the side and are comprised of a first leg and a second leg with a recessed boss disposed therebetween. The boss is substantially keyhole shaped so that it is complementary in size and shape to apertures 234. A region of each boss defines a hole 254 therein, preferably the region that will align with the circular region of aperture 234. A complementary shaped insert 256 is inserted into the hole 254. The insert 256 may be a magnet. The insert or magnet 256 is adhered in place and preferably forms the circular region of the keyhole shaped boss 244. The insert or magnet 256 extends from exterior surface of the connector's first arm through to exterior surface of the connector's second arm. The insert 256, when magnetic, may be oriented so that when brought into the proximity of one of magnets 252 on glasses 212, magnet 256 will present an opposite pole to magnet 252. Consequently, the two magnets 256, 250 will be magnetically attracted to each other and auxiliary glasses 212 will thereby be retained on primary glasses 210. If it is desired to later disengage auxiliary glasses 212 from primary glasses 210, the user simply grasps the same and pulls the glasses 212 away from glasses 210. When magnets 256 exit the magnetic field of magnets 250, the attractive force is broken and the auxiliary glasses 212 are able to be separated from primary glasses 210.

It will be understood that in order to accommodate connector 232, the peripheral edge of the lenses 216, 218 may be provided with a notch 251 that is of a size and shape that causes an outermost edge of the connector 232 to be flush with the peripheral edge of the associated lens 216, 218. In other instances, the notch 251 may be omitted and the first and second legs of the connectors 232 may simply snap-fit around the exterior surface of the associated lens 216, 218. In other instances, the frame of the glasses that surrounds and holds the lenses 216, 218 may be notched to receive a portion of the connector 232 therein. In yet other instances, no notches will be provided in either of the lenses 216, 218 or frames to accommodate connectors 232.

Bridge 230 and/or bridge 224 may be fabricated from magnetic material or may be provided with magnets that allow bridge 224 and 230 to be attached to each other when auxiliary glasses 212 are engaged with primary glasses 210. Still further, magnets could be provided in the frame 214 instead of in the lenses 216, 218 of primary glasses 110 or in connectors 232 that are provided on one or both of primary and auxiliary glasses 210, 212.

It will be understood that connectors 232 may be differently configured with the first and second legs being formed from a magnetic material and the insert 256 being formed from a non-magnetic material. In this instance, the holes 250 defined in the auxiliary lenses may be positioned to align with a region of the connectors 232 other than the component 256.

It will also be understood that hole 254 may be defined in a different location in connector 232 such that hole 254 will not align with the keyhole shaped aperture 234 defined in the lens of the primary glasses 210 (or the auxiliary glasses 212 if additionally or alternatively provided with an aperture 234 and connector 232 for engagement therein. In these instances, the differently positioned hole may be located in a region outwardly beyond the peripheral edge of the associated lens in which the aperture 234 is defined.

FIG. 10 shows an eyeglass system where the primary glasses 210 of FIG. 9 are used in conjunction with the auxiliary glasses 112 (FIG. 7). In other words, both the primary glasses 210 and the auxiliary glasses 112 are provided with keyhole shaped apertures therein and in which connectors are engaged. Each connector may include a magnet and the magnets in the connectors of primary glasses 210 may be selectively engaged with the magnets in the connectors of auxiliary glasses 212 in order to hold the primary and auxiliary glasses in engagement with each other.

Thus, in accordance with an aspect of the disclosure, a method of detachably engaging a pair of auxiliary glasses to a pair of primary glasses includes the steps of:

providing a pair of auxiliary lenses and/or a pair of primary glasses with at least one aperture defined in each lens thereof; where the aperture extends between an interior surface and an exterior surface of the lens and originates in a peripheral edge of the lens and extends inwardly thereinto;

providing a connector comprising a first arm and a second arm disposed parallel to and spaced from each other; and a boss extending between the first and second arms; where the boss is complementary to the aperture;

snap-fitting the connector into one of the apertures in one of the pair of lenses;

hooking an angled terminal end of the second arm of the connector over a top edge of one of a pair of lenses of the other of auxiliary pair of glasses or the primary pair of glasses.

The step of providing the pair of glasses (auxiliary or primary) includes providing lenses which define a keyhole-shaped aperture therein; and the step of providing the connector includes providing a connector with a keyhole-shaped boss and engaging a magnet in the connector. The method may further comprise providing a magnet on the other of the auxiliary or primary pair of glasses either in the form of an additional connector that includes a magnet or by providing a magnet on the lens of the other of the auxiliary or primary pair of glasses. The magnets on the auxiliary glasses and primary glasses are brought into contact to secure the two pairs of glasses to each other. It should be noted that a magnet may be adhered to a surface of the lens or be provided in a carrier that is engaged with the lens or frame, where the carrier positions the magnet proximate a front surface, back surface or peripheral side surface of the lens.

Still further, the step of providing the pair of auxiliary glasses may further include the step of securing a bridge between the first and second auxiliary lenses. This step is accomplished by defining a bridge aperture in the peripheral edge of each auxiliary lens, where the bridge aperture extends from the interior surface to the exterior surface of the associated auxiliary lens; and snap-fitting a complementary-shaped boss provided at each end of the bridge into one of the bridge apertures.

It will be understood that the connectors 234 shown in FIGS. 9 and 10 may be replaced with connectors that do not include magnets. These magnet-free connectors may be provided engaged in keyhole shaped apertures formed in the peripheral edge of lenses in the primary glasses and/or the auxiliary glasses. The magnet-free connectors may be utilized to capture and hold the lens of the other pair of glasses (as has been previously described herein) such that the primary and auxiliary lenses are held in close proximity to each other.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

The invention claimed is:

1. An eyeglass system comprising:
   a pair of primary glasses adapted to be detachably engaged with a pair of auxiliary glasses; wherein the pair of primary glasses comprises:
     a frame having a first lens holding region and a second lens holding region and a bridge connecting the first and second lens holding regions to each other; wherein the frame further comprises a first leg extending outwardly from the first lens holding region; and a second leg extending outwardly from the second lens holding region;
   a first primary lens and a second primary lens; each of the first and second primary lenses including an exterior surface, an interior surface, and a peripheral edge extending between the interior and exterior surfaces; wherein the first primary lens is retained in the first lens holding region and the second primary lens is retained in the second lens holding region;

an aperture defined in each of the first and second primary lenses, where the aperture extends between the interior and exterior surfaces thereof, and wherein the aperture originates in the peripheral edge and extends for a distance into the respective auxiliary lens;

a connector engaged in each aperture of the first and second primary lenses; wherein the connectors are adapted to detachably engage the pair of primary glasses and the pair of auxiliary glasses together; wherein each connector has a first arm and a second arm; wherein the first and second arms are disposed parallel to and spaced apart from each other; and a boss extends between the first and second arms; and wherein the boss is complementary shaped to the aperture and is received therein; and wherein each connector defines a hole therein, said hole extending from an exterior surface of the second arm through a portion of the boss and to at least an interior surface of the first arm; and wherein an insert is engaged in the hole.

2. The eyeglass system as defined in claim 1, wherein the connector or the insert is fabricated from a magnetic material.

3. The eyeglass system as defined in claim 1, wherein the aperture in each of the first and second primary lenses is keyhole shaped and the boss of each connector is a complementary keyhole shape.

4. The eyeglass system as defined in claim 1, wherein each of the first and second arms of each connector includes a bevel proximate an outer edge thereof; and the boss is recessed relative to the bevel.

5. The eyeglass system as defined in claim 1, wherein when the connector is engaged in the aperture, the first arm thereof is located adjacent and generally parallel to the exterior surface of the associated first or second primary lens and the second arm is located adjacent and generally parallel to the interior surface thereof.

6. The eyeglass system as defined in claim 5, wherein a lip is provided on one or both of the first and second arms and the lip extends laterally outwardly away from an exterior surface of the boss and terminates at an outer edge of the respective one of the first and second arms; and when the connector is engaged with the associated first or second primary lens, the lip is located adjacent one or the other of the interior and exterior surfaces thereof.

7. The eyeglass system as defined in claim 1, wherein the boss extends transversely between the interior and exterior surfaces of the associated first or second primary lens.

8. The eyeglass system as defined in claim 1, wherein the boss includes a first region and a second region; and the first region is generally circular in cross-section and the second region is generally trapezoidal in cross-section and the second region extends outwardly from a section of the first region's circumference.

9. The eyeglass system as defined in claim 1, wherein each of the first and second arms is free of openings.

10. The eyeglass system as defined in claim 1, wherein the connector snap-fits into the aperture.

11. The eyeglass system as defined in claim 1, wherein each connector includes a first leg and a second leg that are oriented generally at right angles to each other; and wherein the first and second arms and the boss together comprise the first leg of the connector.

12. The eyeglass system as defined in claim 11, wherein the second leg extends from proximate the exterior surface of the first arm to a distance beyond the exterior surface of the second arm; and the second leg has a terminal end spaced from the second arm; and the terminal end is angled relative to a remaining portion of the second leg.

13. The eyeglass system as defined in claim 1, further comprising:
a pair of auxiliary glasses for detachable engagement with the pair of primary glasses; wherein the auxiliary glasses include:
a first auxiliary lens and a second auxiliary lens; each of the first and second auxiliary lenses including an exterior surface, an interior surface, and a peripheral edge extending between the interior and exterior surfaces;
an auxiliary bridge operatively connecting the first and second auxiliary lenses together;
an auxiliary aperture defined in each of the first and second auxiliary lenses, where the auxiliary aperture extends between the interior and exterior surfaces thereof, wherein the auxiliary aperture originates in the peripheral edge and extends for a distance into the respective auxiliary lens;
an auxiliary connector engaged in the auxiliary aperture of each of the first and second auxiliary lenses; wherein the auxiliary connectors detachably engages the pair of auxiliary glasses to the pair of primary glasses; wherein each auxiliary connector has a first arm and a second arm and the first and second arms of the auxiliary connectors are disposed parallel to and spaced apart from each other; and an auxiliary boss extends between the first and second arms of the auxiliary connectors; and wherein the auxiliary boss is complementary shaped to the auxiliary aperture and is received therein; and wherein each auxiliary connector defines an auxiliary hole therein, said auxiliary hole extending from an exterior surface of the second arm of the auxiliary connector through a portion of the auxiliary boss and to at least an interior surface of the first arm of the auxiliary connector; and wherein an auxiliary insert is engaged in the auxiliary hole.

14. The eyeglass system as defined in claim 13, wherein one of the auxiliary connector or auxiliary insert is fabricated from a magnetic material.

15. A pair of primary glasses for selective engagement with a pair of auxiliary glasses; wherein the primary glasses comprise:
a first lens region adapted to be positioned adjacent a first lens of the pair of auxiliary glasses;
a second lens region adapted to be positioned adjacent a second lens of the pair of auxiliary glasses; wherein each of the first and second lens regions has an exterior surface, an interior surface, and a peripheral edge extending between the interior and exterior surfaces;
an aperture defined in each of the first and second lens regions; where the aperture extends between the interior and exterior surfaces thereof, wherein the aperture originates in the peripheral edge and extends for a distance into the respective one of the first and second lens regions;
a connector engaged in the aperture of each of the first and second lens regions; wherein the connectors are adapted to detachably engage the pair of primary glasses to the pair of auxiliary glasses; wherein each connector has a first arm and a second arm and the first and second arms are disposed parallel to and spaced apart from each other; and a boss extends between the first and second arms; and wherein the boss is complementary shaped to the aperture and is received therein, and wherein each connector defines a hole therein, said hole extending from an exterior surface of the second arm through a portion of the boss and to at least an interior surface of the first arm; and wherein an insert is engaged in the hole.

16. The pair of primary glasses as defined in claim 15, wherein the insert is a magnet.

17. The pair of auxiliary glasses as defined in claim 15, wherein the aperture in each of the first and second lens regions is keyhole shaped and the boss of each connector is a complementary keyhole shape.

18. A pair of primary glasses for selective engagement with a pair of auxiliary glasses; wherein the primary glasses comprise:
- a first lens region adapted to be positioned adjacent a first lens of the pair of auxiliary glasses;
- a second lens region adapted to be positioned adjacent a second lens of the pair of auxiliary glasses; wherein each of the first and second lens regions has an exterior surface, an interior surface, and a peripheral edge extending between the interior and exterior surfaces;
- an aperture defined in each of the first and second lens regions; where the aperture extends between the interior and exterior surfaces thereof, wherein the aperture originates in the peripheral edge and extends for a distance into the respective one of the first and second lens regions;
- a connector engaged in the aperture of each of the first and second lens regions; wherein the connectors are adapted to detachably engage the pair of primary glasses to the pair of auxiliary glasses; wherein each connector has a first arm and a second arm and the first and second arms are disposed parallel to and spaced apart from each other; and a boss extends between the first and second arms; and wherein the boss is complementary shaped to the aperture and is received therein; and wherein each of the first and second arms of each connector includes a bevel proximate an outer edge thereof; and the boss is recessed relative to the bevel.

19. The pair of auxiliary glasses as defined in claim 18, further comprising an auxiliary bridge operatively connecting the first and second lens regions together.

* * * * *